Aug. 30, 1960 W. J. CADDEN 2,951,230
SHIFT REGISTER COUNTER
Filed Oct. 6, 1955
4 Sheets-Sheet 1
FIG. 1
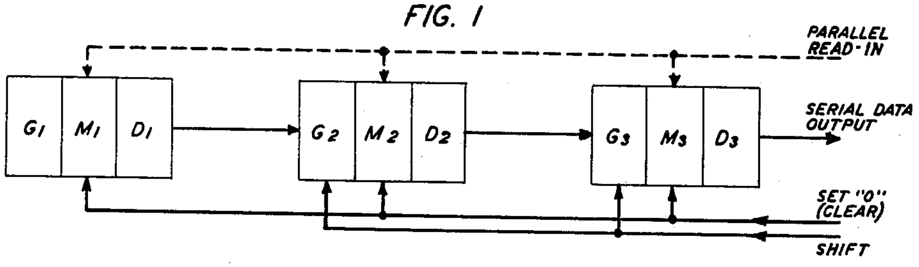
FIG. 2
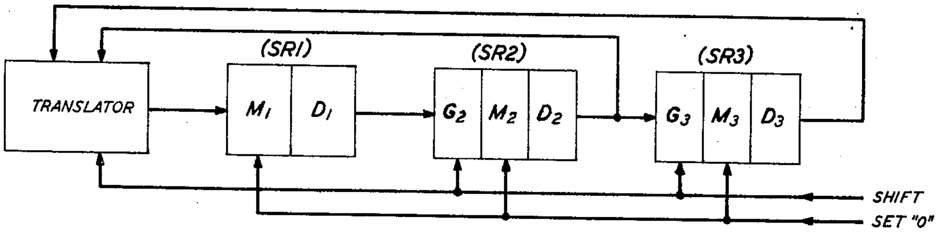
FIG. 3
| | √ | √ |
|---|---|---|
| 0 | 0 | 1 |
| 1 | 0 | 0 |
| 0 | 1 | 0 |
| 1 | 0 | 1 |
| 1 | 1 | 0 |
| 1 | 1 | 1 |
| 0 | 1 | 1 |
| 0 | 0 | 1 |
FIG. 4
| | | √ | √ |
|---|---|---|---|
| 0 | 0 | 0 | 1 |
| 1 | 0 | 0 | 0 |
| 0 | 1 | 0 | 0 |
| 0 | 0 | 1 | 0 |
| 1 | 0 | 0 | 1 |
| 1 | 1 | 0 | 0 |
| 0 | 1 | 1 | 0 |
| 1 | 0 | 1 | 1 |
| 0 | 1 | 0 | 1 |
| 1 | 0 | 1 | 0 |
| 1 | 1 | 0 | 1 |
| 1 | 1 | 1 | 0 |
| 1 | 1 | 1 | 1 |
| 0 | 1 | 1 | 1 |
| 0 | 0 | 1 | 1 |
| 0 | 0 | 0 | 1 |
FIG. 5
FIRST ORBIT 21 STATES
| | | | √ | √ |
|---|---|---|---|---|
| 0 | 0 | 0 | 0 | 1 |
| 1 | 0 | 0 | 0 | 0 |
| 0 | 1 | 0 | 0 | 0 |
| 0 | 0 | 1 | 0 | 0 |
| 0 | 0 | 0 | 1 | 0 |
| 1 | 0 | 0 | 0 | 1 |
| 1 | 1 | 0 | 0 | 0 |
| 0 | 1 | 1 | 0 | 0 |
| 0 | 0 | 1 | 1 | 0 |
| 1 | 0 | 0 | 1 | 1 |
| 0 | 1 | 0 | 0 | 1 |
| 1 | 0 | 1 | 0 | 0 |
| 0 | 1 | 0 | 1 | 0 |
| 1 | 0 | 1 | 0 | 1 |
| 1 | 1 | 0 | 1 | 0 |
| 1 | 1 | 1 | 0 | 1 |
| 1 | 1 | 1 | 1 | 0 |
| 1 | 1 | 1 | 1 | 1 |
| 0 | 1 | 1 | 1 | 1 |
| 0 | 0 | 1 | 1 | 1 |
| 0 | 0 | 0 | 1 | 1 |
| 0 | 0 | 0 | 0 | 1 |
SECOND ORBIT 7 STATES
| | | | √ | √ |
|---|---|---|---|---|
| 0 | 0 | 1 | 0 | 1 |
| 1 | 0 | 0 | 1 | 0 |
| 1 | 1 | 0 | 0 | 1 |
| 1 | 1 | 1 | 0 | 0 |
| 0 | 1 | 1 | 1 | 0 |
| 1 | 0 | 1 | 1 | 1 |
| 0 | 1 | 0 | 1 | 1 |
| 0 | 0 | 1 | 0 | 1 |
THIRD ORBIT 3 STATES
| | | | √ | √ |
|---|---|---|---|---|
| 0 | 1 | 1 | 0 | 1 |
| 1 | 0 | 1 | 1 | 0 |
| 1 | 1 | 0 | 1 | 1 |
| 0 | 1 | 1 | 0 | 1 |
INVENTOR
W. J. CADDEN
BY [signature]
ATTORNEY FIG. 6
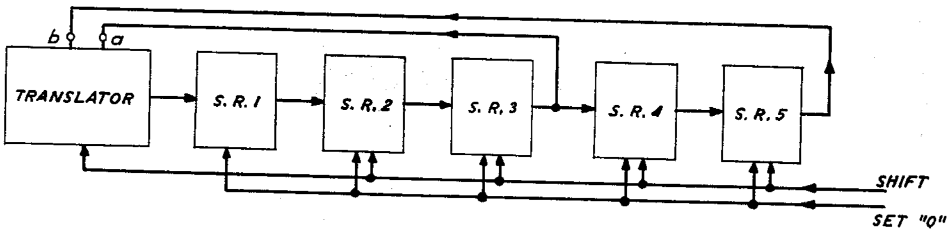
FIG. 7
| | | √ | | √ |
|---|---|---|---|---|
| 0 | 0 | 0 | 0 | 1 |
| 1 | 0 | 0 | 0 | 0 |
| 0 | 1 | 0 | 0 | 0 |
| 0 | 0 | 1 | 0 | 0 |
| 1 | 0 | 0 | 1 | 0 |
| 0 | 1 | 0 | 0 | 1 |
| 1 | 0 | 1 | 0 | 0 |
| 1 | 1 | 0 | 1 | 0 |
| 0 | 1 | 1 | 0 | 1 |
| 0 | 0 | 1 | 1 | 0 |
| 1 | 0 | 0 | 1 | 1 |
| 1 | 1 | 0 | 0 | 1 |
| 1 | 1 | 1 | 0 | 0 |
| 1 | 1 | 1 | 1 | 0 |
| 1 | 1 | 1 | 1 | 1 |
| 0 | 1 | 1 | 1 | 1 |
| 0 | 0 | 1 | 1 | 1 |
| 0 | 0 | 0 | 1 | 1 |
| 1 | 0 | 0 | 0 | 1 |
| 1 | 1 | 0 | 0 | 0 |
| 0 | 1 | 1 | 0 | 0 |
| 1 | 0 | 1 | 1 | 0 |
| 1 | 1 | 0 | 1 | 1 |
| 1 | 1 | 1 | 0 | 1 |
| 0 | 1 | 1 | 1 | 0 |
| 1 | 0 | 1 | 1 | 1 |
| 0 | 1 | 0 | 1 | 1 |
| 1 | 0 | 1 | 0 | 1 |
| 0 | 1 | 0 | 1 | 0 |
| 0 | 0 | 1 | 0 | 1 |
| 0 | 0 | 0 | 1 | 0 |
| 0 | 0 | 0 | 0 | 1 |
FIG. 8
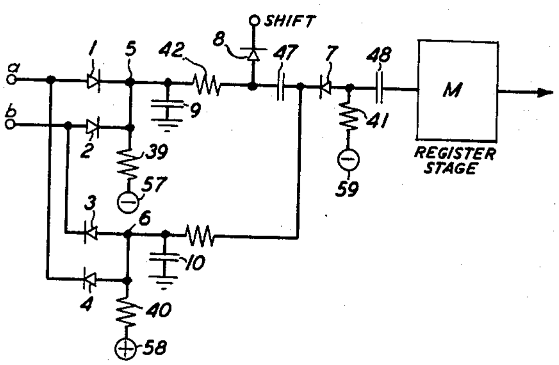
FIG. 9
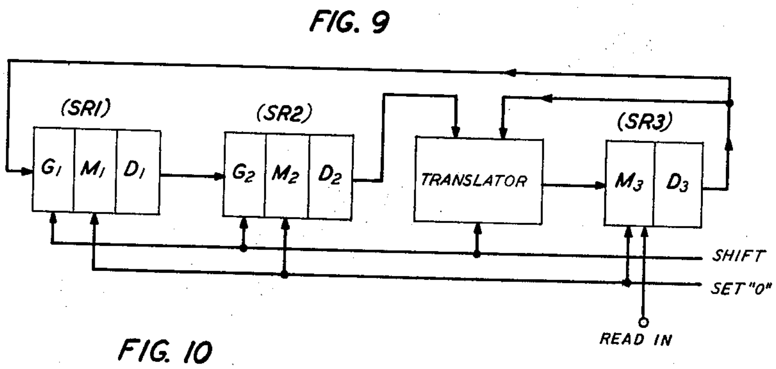
FIG. 10
| | √ | √ |
|---|---|---|
| 0 | 0 | 1 |
| 1 | 0 | 1 |
| 1 | 1 | 1 |
| 1 | 1 | 0 |
| 0 | 1 | 1 |
| 1 | 0 | 0 |
| 0 | 1 | 0 |
| 0 | 0 | 1 |
INVENTOR
W. J. CADDEN
BY [signature]
ATTORNEY INVENTOR
W. J. CADDEN
BY [signature]
ATTORNEY

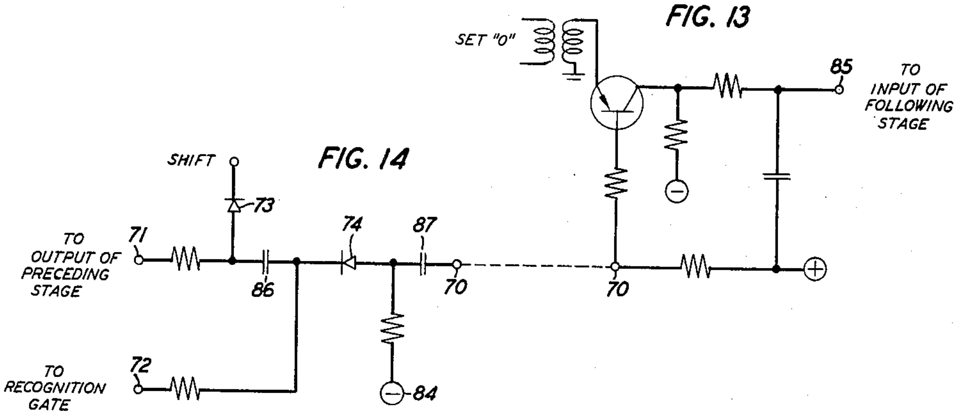
FIG. 13, FIG. 14
FIG. 15
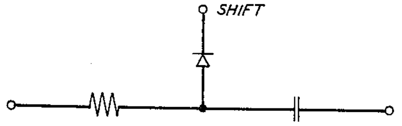
FIG. 16
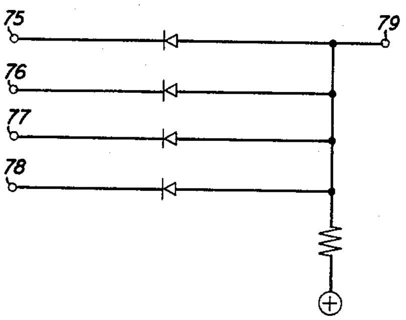
FIG. 17
| | | √ | √ |
|---|---|---|---|
| 0 (x) | 0 | 1 | 0 |
| 1 | 0 | 0 | 1 |
| 1 | 1 | 0 | 0 |
| 0 | 1 | 1 | 0 |
| 1 | 0 | 1 | 1 |
| 0 | 1 | 0 | 1 |
| 1 | 0 | 1 | 0 |
| 1 | 1 | 0 | 1 |
| 1 | 1 | 1 | 0 |
| 1 | 1 | 1 | 1 |
INVENTOR
W. J. CADDEN
BY [signature]
ATTORNEY United States Patent Office 2,951,230

Patented Aug. 30, 1960

2,951,230

SHIFT REGISTER COUNTER

William J. Cadden, Madison, N.J., assignor to Bell Telephone Laboratories, Incorporated, New York, N.Y., a corporation of New York Filed Oct. 6, 1955, Ser. No. 538,904

20 Claims. (Cl. 340—168)

This invention relates to counting devices and more particularly to counting devices associated with transistor shift registers.

A counting circuit, as used in the switching art and related fields, is required to recognize each appearance of a selected input condition, and to establish a unique state for each successive appearance of the input condition. As a result, the number of times that the input condition has appeared in a given cycle may be determined at any time by reference to the state of the elements in the circuit. The number of separate appearance conditions which may be handled by a given counter is determined by the number of separate elements in the counter, the counter configuration, and other parameters.

In a number of counters in general use each element, or stage, energizes the following element upon the appearance of an input condition. Where several elements are in tandem, the successive and sequential energization of cascaded stages may produce critical or marginal operating conditions in the later stages.

An object of this invention is to provide for the counting of separate input conditions wherein the states of all counting elements of the counter are modified simultaneously rather than successively in stages.

Another object of this invention is to facilitate the simultaneous determination of the states of all counter elements on the appearance of the input condition, obviating marginal interstage input requirements.

A further object of this invention is to provide a simple and economical counting arrangement employing transistor shift register stages.

These and other objects of this invention are achieved by utilizing a shift register, the stages of which are all connected in a closed loop, and a gate translator. In an illustrative embodiment, a three-stage shift register is employed. The information to be shifted into the first stage is obtained by a comparison of the information contained in the last two stages. If the states of the last two stages are similar, a binary "0" is shifted into the first stage; if dissimilar, a binary "1" is shifted into the first stage. The state of the second stage is transferred directly into the third stage, and the state of the first stage is shifted directly into the second stage. The counter may be started by reading any number into the stages. Thereafter, corresponding to the number of shift pulses, the counter will traverse all of its possible states (except 000) and keep recycling through these states until the shift pulses terminate.

The invention may be more readily understood by reference to the attached specification, appended claims and following drawings in which:

Fig. 1 shows in outline form the principles of operation of a type of shift register which may be utilized in conjunction with applicant's invention;

Fig. 2 illustrates schematically a three-stage shift register counter embodying applicant's invention;

Figure 11:
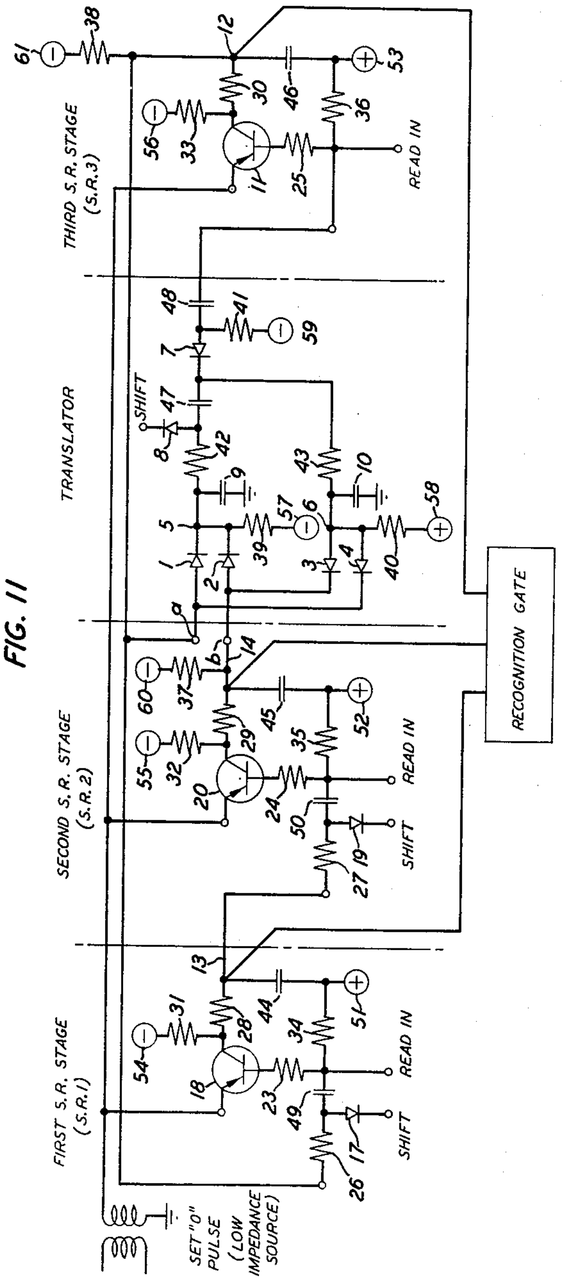
Figure 12:
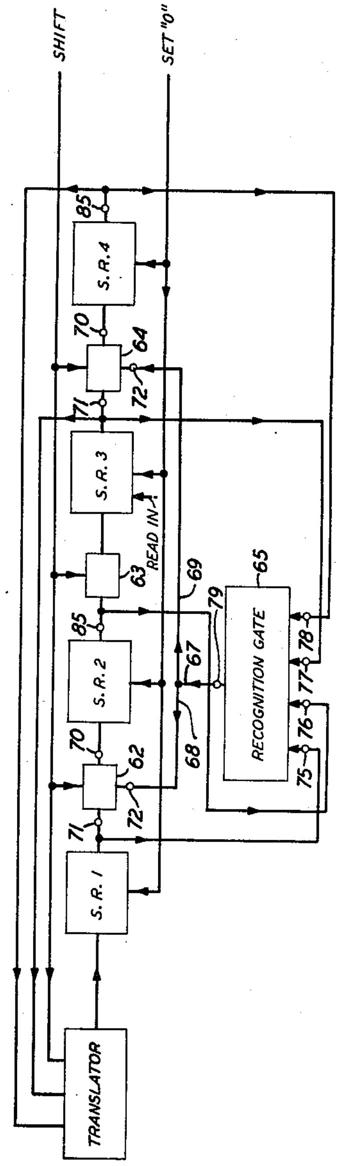

Fig. 3 includes all of the binary states through which the counter of Fig. 2 will pass;

Fig. 4 lists all of the binary states through which a four-stage shift register counter patterned after the counter of Fig. 2 will pass;

Fig. 5 illustrates the three orbits containing the thirty-one states of a five-stage shift register counter patterned after the counter of Fig. 2;

Fig. 6 illustrates in outline form the configuration of a five-stage shift register counter which will recycle in a single orbit through all of the thirty-one possible states;

Fig. 7 is a compilation of the thirty-one states through which the counter of Fig. 6 will pass;

Fig. 8 illustrates a gate translator that may be employed in conjunction with applicant's invention;

Fig. 9 shows in outline form a configuration for a three-stage shift register as an alternative to that of Fig. 1;

Fig. 10 is a compilation of the seven possible states through which the shift register of Fig. 9 will pass;

Fig. 11 is a detail circuit showing the electrical parameters of the configuration of Fig. 9;

Fig. 12 indicates in outline form a shift register counter having a ten-pulse recycling orbit;

Fig. 13 is a detailed circuit of one of the components of the shift register counter shown in Fig. 12;

Fig. 14 is a detailed circuit of two of the inhibit control gating elements used in the shift register counter of Fig. 12;

Fig. 15 is a detailed circuit of a coincidence type of gate employed in said register of Fig. 12;

Fig. 16 shows in detail form still another type of gate employed in said register of Fig. 12; and Fig. 17 lists all of the binary states through which the register counter of Fig. 12 will pass.

Referring now to Fig. 1, the principles of operation of a type of shift register which may be utilized in conjunction with applicant's invention are illustrated. Each stage of the shift register may include a gate G–, memory M– and a storage, or delay, circuit D–. Each stage unites the functions of gating, memory and storage in a single entity, but for clarity of explanation these functions are separately indicated in Fig. 1. The memory portion M– of the stage may be a single transistor flip-flop circuit which is capable of remembering a binary "0" or a binary "1" condition. A shift register may be composed of any desired number of these stages in tandem.

At the start of the process of shifting information, data is parallel read, or fed, into the memory stages M– of the shift register. This is usually accomplished by applying negative pulses to the bases of the (PNP) transistors in those stages in which a binary "1" condition is to be stored. A "0" is, in effect, read into a memory stage by failing to read in a "1," it being assumed that all of the memory elements are initially in the "0" condition, or driven thereto by a set "0" pulse, explained herein. Sufficient time is then permitted to allow the associated storage, or delay, stages D– to assume the state of the corresponding memory stage. Subsequently, a clear or a set "0" pulse is applied to the memory stages M– to change all of said stages to a binary "0" condition, readying them for the reception of the data to be shifted. The set "0" may be accomplished by transmitting, from a low impedance source, a negative pulse to the emitter of each transistor.

A shift pulse follows the set "0" pulse after a short interval, such that the previous data remains in the delay stages D–. In its physical realization, the shift pulse may comprise a negative pulse having a duration that is short in comparison to the delay period applied to the gate of each stage. The advent of the shift pulse permits enabling of the gate G– between a preceding delay D– and the following memory stage M–, in consequence of which the memory stage M– takes on the state of the preceding delay stage D–. The gates G– are operated only by the coincidence of the shift pulse and a positive or binary "1" condition at the input of the gate G–. If the input to the gate is negeative, or binary "0," the gate will not be enabled, and the shift pulse will not be effective. However, since the previous set "0" pulse conditioned the following memory M– to binary "0," the effect with a "0" condition at the input of the gate G– is the same as if the "0" condition in the preceding delay D– had been transferred to the following memory M–.

On the other hand, if the gate is enabled by the coincidence of the shift pulse and a positive or binary "1" condition at the input of the gate, the following memory stage M– is conditioned to the positive or binary condition "1." Thus, on the occurrence of the shift pulse, whichever digit "1" or "0" is stored in a preceding delay stage D– is, in effect, transferred to the succeeding memory stage M–, this transference taking place by the opening of the intermediate gate G– if the digit is "1," or by the non-disturbance of the "0" condition in the memory stage M– in consequence of the previous set "0" pulse.

After the shift pulse, the gates G– are again disabled and sufficient time is allowed for the delay stages D– to assume the same state as their associated memory stages M–.

In Fig. 2 a three-stage shift register circuit including a translator is shown in outline form. It may be seen that the information which is delivered into the first stage SR1 comes from the translator, which obtains from and compares the data in the second and third shift register stages SR2 and SR3. If the conditions of the second and third stages SR2 and SR3 are similar, a binary "0" condition is transferred by the translator into the first shift register stage SR1. If the conditions are dissimilar a binary "1" is transferred from the translator into the first stage.

The counter may be started by reading a "1" into any of the stages SR1 . . . SR3, the remaining stages having previously been set at "0." Subsequently on the occurrence of each shift pulse, the counter will continue to cycle through all of its possible states and keep recycling until the shift pulses terminate. For example, if a "1" is read into the third stage SR3, the number initially in the register is 001. The first shift pulse thereafter causes the translator to compare the "0" in the second stage SR2 and the "1" in the third stage SR3. Since these two digits are different, a "1" is caused to be shifted from the translator into the first stage SR1. Thus the number in the shift register after the first shift pulse is 100. On the succeeding shift pulse the translator compares the two "0's" in the second and third stages SR2 and SR3. Since the digits are alike, a "0" is shifted into the first stage SR1 and the "1" and "0" in the first and second stages SR1 and SR2 are shifted into the second and third stages SR2 and SR3, rsepectively. This cycle continues until all of the possible states are attained, at which time the counter will recycle and recommence the original cycle. For the complete sequence of states of the counter of Fig. 2, reference may be made to Fig. 3 in which (as also in Figs. 4, 5, 7, 10 and 17 for counters still to be described) the two check marks above the two columns indicate the stages that are compared and the cross mark above the second row indicates the stage into which the resultant digit is shifted. It may be noted from Fig. 3 that all of the states excluding 000 are obtained. This follows since, if the number 000 appears in the shift register, a succession of "0's" will be transferred into the first stage SR1, blocking any further change in the state of each of the other two stages SR2 and SR3.

The principle of operation described above for three-stage shift registers applies equally well for a four-stage shift register. A comparison of the information in the third and fourth stages is made to determine the information to be shifted into the first stage. The information in the first, second and third stages is shifted directly to the second, third and fourth stages, respectively. The complete sequence of states for this type of shift register is shown in Fig. 4.

If five stages are employed using the configuration of Fig. 2, i.e., with a comparison of the information in the last two stages, a single recycling orbit is not achieved. Instead, it has been empirically established that three separate recycling orbits result, containing twenty-one, seven, and three states, respectively. The counter may be recycled in any particular orbit by intially reading in a number appearing in that orbit. Thereafter, the counter will continue in the selected orbit. A compilation of the three orbits is shown in Fig. 5.

As an alternative to the three orbits obtained with a five-stage shift register of the configuration shown in Fig. 2, a single recycling orbit may be obtained by using the configuration of Fig. 6. In this case, a listing of all the states obtained by a comparison between the conditions of the third and fifth stages reveals that a full count of thirty-one states (00000 excluded) is obtained. The conditions in the first, second, third and fourth stages shift to the second, third, fourth and fifth stages directly. A complete listing of the thirty-one possible states in the single recycling orbit of the shift register counter of Fig. 6 is shown in Fig. 7.

From the foregoing examples it may be deduced that varying the stages of information to be compared, and varying the stage into which the digit resulting from the comparison is transferred, will result in varying count sequences and differing numbers of orbits.

The above illustrations will serve as a foundation for the explanation of further variations of the embodiment shown, for the purpose of obtaining unique cycling arrangements.

It may be seen that the above arrangements can be simply modified to count irregularly occurring long duration pulses. The leading edge of such pulses, if negative for example, may be used to trigger a first monopulser or monostable amplifier. In turn, the leading edge of a positive pulse emitted by the first monopulser may, for illustration, trigger a second monopulser to supply a negative set "0" pulse to the memory stages. The trailing edge of the pulse emitted by the first monopulser may be differentiated for use as a negative shift pulse. This type of arrangement obviates the element of periodicity in the pulses to be counted.

Various types of gate translators may be used in conjunction with the present invention. However, the embodiment shown in Fig. 8 has the advantage that it is gated by the shift pulse obviating the problems of coincidence.

The gate-type translator employed must be such that if both inputs are alike, that is 0 and 0 or 1 and 1, the output is a binary "0" condition. If the two inputs are a 0 and 1 the output should be a binary "1" condition. It is further necessary that the binary "1" conditions occur only when a shift pulse occurs. Referring to Fig. 8, it may be seen that if *a* and *b* represent the two potential inputs, then, owing to the poling of the (asymmetrically conducting) diode gates 1 and 2, terminal 5 will follow the most positive of said two gates. Conversely, owing to the opposite poling of the diode gates 3 and 4, terminal 6 will follow the most negative of said last mentioned gates.

Assume that both *a* and *b* are in the positive or binary "1" condition (herein the positive or binary "1" condition will represent a higher voltage, for example −1½ volts, and the negative or binary "0" condition will represent a lower voltage, for example −14 volts). Due to the connection of negative bias battery 57 through resistor 39 to terminal 5 and to both diodes 1 and 2, terminal 5 will be at −1½ volts. Similarly, and because of the connection of positive bias voltage 58 through resistor 40 to terminal 6 and to both diodes 3 and 4, terminal 6 will also be at −1½ volts.

Whether any binary digit "1" conditions represented by −1½ volts will, in effect, pass through the diode gate 7 into the following memory stage M− of the counter will depend on the conductive condition of said gate 7 at the time that the shift pulse is applied to the diode 8.

On its anode side, diode 7 has a potential applied thereto from negative battery 59 through resistor 41 which potential is between −1½ volts representing the binary digit "1" and the −14 volts representing the binary digit "0." Based on the parameters of the circuit which are given below by way of example, said potential will be −10½ volts. With this potential on the anode and (the presently assumed) −1½ volts on the cathode of diode 7, said diode will be in the non-conducting condition. Consequently when the negative shift pulse is applied at gate 8, said pulse will not pass through diode 7 into the following memory stage.

Consider now that both the *a* and *b* inputs are negative, or in the binary "0" condition. Terminals 5 and 6 will also be negative, or at approximately −14 volts. Gate 7 now has a 10½ volt potential on the anode side and a −14 volt potential on the cathode side, thereby placing it in the forward resistance or conductive condition. Terminal 5 however, being at −14 volts, the cathode side of the shift pulse gate 8 is also at −14 volts. Since the shift pulse will illustratively be −8 volts with a base at −3 volts, the gate is in the non-conductive condition and the pulse will not pass the gate. Again in this instance of two similar conditions on inputs *a* and *b*, no pulse is permitted to pass to the following memory stage M−.

In the instance of a positive or binary "1" condition on input *a* and a binary "0" condition on input *b*, terminal 5 will be at −1½ volts and terminal 6 will be at −14 volts. As a result, gate 7 has a voltage of −10½ volts on the anode side and −14 volts on the cathode side, thereby rendering it conductive. Terminal 5, being at −1½ volts, will render shift pulse gate 8 conductive upon the occurrence of the negative shift pulse. As a result, both gates 7 and 8 are in the conductive or forward biased condition and a pulse is transferred to the following memory stage M−.

Similarly, in the instance of a binary "0" condition on input *a* and a binary "1" condition on input *b*, terminal 5 will again be at −1½ volts and terminal 6 will be at −14 volts. Consequently, gate 7 will have a −10½ volt potential on the anode side and a −14 volt potential on the cathode side and will be in its forward biased or conductive condition. Gate 8 will have a −1½ volt potential from terminal 5 on its anode side and therefore will be conductive upon the occurrence of the negative shift pulse. Gates 7 and 8 being conductive, the shift pulse will be transferred to the following memory stage M−.

As later explained in detail in connection with the circuit shown in Fig. 11, a portion of the delay function, or temporary storage D−, of each stage is coupled with the apparatus of the gate circuit of the following stage. Since the gate of such stage following the translator is omitted, as indicated in Fig. 2, the delay must be added in the translator. This is done by adding capacitances 9 and 10 to ground in two branches *a* and *b* of the translator, as shown in Fig. 8.

In the embodiment of the translator illustrated in Fig. 8, the configuration is arranged to provide for a minimal power loss, and a circuit employed wherein power is drawn from an external voltage source; this arrangement, however, is merely exemplary and may not be required in certain other embodiments where different conditions obtain.

As an illustration of a circuit arrangement embodying applicant's invention, a three-stage counter will be described. It is understood that this example is only a single one of the many varied combinations of translator and register stages which may be used to afford varying count sequences and orbits.

The block diagram for this type of counter is shown in Fig. 9. It is apparent that a comparison of the information in the second and third shift register stages is made to determine what information is to be shifted into the third stage. The conditions in the first and third stages are shifted directly into the second and first stages respectively.

The circuit arrangement is shown in Fig. 11. The counter may be initiated in its operation by reading a "1" in any stage, or a "1" in each of a plurality of stages, the condition "0" being the normal state of any stage into which "1" is not read, as already explained. As a simple expedient, a binary "1" condition may be read into the third stage by applying a negative pulse to the base of the transistor 11 from terminal "Read In." The binary conditions in the counter will then be 001. The negative pulse triggers the transistor 11 to the conductive condition, as a consequence of which a potential is developed at terminal 12. By virtue of the parameters of the circuit later given, this potential has the value of −1½ volts, which is the "positive" voltage condition representing the digit 1 which, in respect to the description of the translator of Fig. 8, has previously been stated to be applied at terminals *a* or *b* of said translator as one of the two outputs from the two stages of the counter which the translator is to compare. It may be noted that the original voltage condition at terminal 12 with the shift register stage in the "0" condition was −14 volts as a result of voltage supply 56 (see table of voltage supplies infra). There is a substantial rise in voltage at terminal 12 in the conductive or "1" condition. This derives from the fact that during the "0" or nonconducting condition of the shift register stage, the impedance between emitter and collector is relatively great. Thus, the voltage at the intersection of resistances 30 and 33 is close to −14 volts (from potential source 56). During the "on" condition of the transistor when the collector-emitter impedance is materially reduced, the voltage at the intersection of resistances 30 and 33 approaches ground potential (−1½ volts) as a result of the ground from the secondary winding of the set "0" pulse transformer. The voltage at terminal 12 is substantially equal to the voltage at the point between resistances 30 and 33. When the transistor is again turned off and the stage assumes the "0" condition, the impedance of the emitter-collector circuit is again increased and the voltage at the junction between resistances 30 and 33 and also the voltage at terminal 12 again falls to substantially the voltage of potential source 56 which is illustratively −14 volts. This description of operation for the third shift register stage SR3 is equally applicable to the other stages.

If the negative read-in impulse (illustratively applied to transistor 11) is also applied to the transistor of the first stage SR1 or that of the second stage SR2, then −1½ volts would similarly be present at the output terminal 13 of stage SR1 or output terminal 14 of stage SR2. In the absence of read-in pulses, however, output terminals 13 and 14 will be at the "0" condition or −14 volts, and they are so assumed to be for the purpose of this description.

Since "0" has been assumed to be registered in stages SR1 and SR2, terminal 5 of the translator (which is identical with the translator shown in Fig. 8) follows the most positive of the gates 1 and 2 and will have a −1½ volt potential derived from the output of gate 1 through terminal 12. Terminal 6 which follows the most negative potential of the outputs of gates 3 and 4 will have a −14 volt potential from the output of gate 3 through terminal 14. Gate 7 will have a potential on the anode side equal to −10½ volts as explained in Fig. 8, and a −14 volt potential on the cathode side from terminal 6, and therefore, will be in the forward biased, or conductive condition. Shift pulse gate 8 will have its anode at a potential of −1½ volts from terminal 5 and will be in the conductive condition with reference to the shift pulse, said pulse having a base of −3 volts.

It may be noted that the binary "1" condition represented by the −1½ volts at the output terminal 12 is effective to charge the associated delay or storage capacitor 46 which develops a potential representative of the digit stored in the associated transistor flip-flop 11, the binary digit "0" in the transistor flip-flops of shift register stages SR1 and SR2 being similarly stored in the respective storage capacitors 44 and 45. After a brief interval subsequent to read-in, and in order to allow the various delay capacitors 44, 45, 46, etc. to achieve said potential representing the digits stored in the associated memory element (transistor flip-flop), all of the transistors are set to "0" condtion by the set "0" pulse which may comprise a negative pulse applied to the emitters of the transistors from the low impedance set "0" pulse source.

Subsequently, upon the occurrence of the following shift pulse (while the digits remain in the delay capacitors, and since gates 7 and 8 are in the conductive condition as explained above), a negative pulse will be applied to the base of the third stage transistor 11 from the shift pulse source through gate 8, condenser 47, gate 7, condenser 48 and resistor 25, establishing a binary "1" condition therein. Simultaneously, the −1½ volt potential from terminal 12 reacting on the input gate of shift register stage SR1 through resistor 26 will enable shift pulse gate 17 to render said gate conductive. Thus the shift pulse will traverse gate 17, condenser 49 and resistor 23 to the base of the first stage transistor 18 establishing a binary "1" condition therein. The "0" condition originally in the first stage will produce a −14 volt output on terminal 13 which reacts through resistor 27 on the input gate of the second shift register stage SR2 applying a reverse bias potential on gate 19 rendering it non-conductive. Thus no shift pulse can traverse gate 19 and the original "0" condition in transistor 20 established by the previous set "0" pulse will remain undisturbed. As a result, the new counter conditions will be 101.

Similarly, upon the occurrence of the following shift pulse the conditions will be 111, etc. A complete exposition of all of the possible states using the shift register configuration of Fig. 9 is listed in Fig. 10. Again all of the possible binary states which may be achieved from three separate counter stages are depicted, with the exclusion of 000.

It may be seen that compensating networks 37 and 38 and their respective potential supplies 60 and 61 are supplied to compensate for the loading effect of the translator. They serve as contant current sources when the stages are in the "0" state, and have very little effect when the stages are in the "1" state.

As illustrative of the values which the circuit parameters of Figs. 8 and 11 may advantageously assume, the following compilation may be consulted:

| Resistance Elements: | Ohms |
|---|---|
| 23 | 510 |
| 24 | 510 |
| 25 | 510 |
| 26 | 7,500 |
| 27 | 7,500 |
| 28 | 470 |
| 29 | 470 |
| 30 | 470 |
| 31 | 820 |
| 32 | 820 |
| 33 | 820 |
| 34 | 820 |

| Resistance Elements: | Ohms |
|---|---|
| 35 | 820 |
| 36 | 820 |
| 37 | 75,000 |
| 38 | 100,000 |
| 39 | 300,000 |
| 40 | 300,000 |
| 41 | 15,000 |
| 42 | 8,200 |
| 43 | 4,700 |

| Capacitance Elements: | Microfarads |
|---|---|
| 9 | $6800\times10^{-6}$ |
| 10 | $3000\times10^{-6}$ |
| 44 | 0.03 |
| 45 | 0.03 |
| 46 | 0.03 |
| 47 | $4300\times10^{-6}$ |
| 48 | 0.01 |
| 49 | $2200\times10^{-6}$ |
| 50 | $2200\times10^{-6}$ |

| Voltage Supplies: | Volts |
|---|---|
| 51 | +4 |
| 52 | +4 |
| 53 | +4 |
| 54 | −14 |
| 55 | −14 |
| 56 | −14 |
| 57 | −150 |
| 58 | +300 |
| 59 | −10.5 |
| 60 | −150 |
| 61 | −150 |

*Diodes.*—Western Electric Type 400A (germanium) or the like.

As shown in Fig. 11, suitable recognition gating means, which may include coincidence gating arrangements or "AND" gates may be connected to the output of each stage to indicate the appearance of a particular count. As illustrative of the type of gate which may be employed, reference may be made to Fig. 16 infra.

Fig. 12 indicates in outline form, a shift register counter which has been modified to form a ten-pulse recycling counter. In this figure, the shift register stages SR1 . . . SR4 contain only the memory M– and delay elements D–, the gating elements 62, 63 and 64 being shown external to the shift register stages for clarity. The recognition gate 65 is used to submit the action of gates 62 and 64 under predetermined conditions.

The modus operandi of this type of shift register counter is as follows: To start the operation, a binary "1" condition is read into the memory element of the third shift register stage SR3. The binary conditions in the four shift register stages are, as a result, 0010. On the advent of the next shift pulse, the conditions in the third and fourth shift register stages are compared by the translator, and a "1" is shifted into the first stage in the manner above explained by Fig. 11. The subsequent binary conditions in the shift register stages are 1001. The shift register counter continues to function in a manner similar to that described for the counter of Fig. 11. However, for state 1111, the recognition gate 65 is activated, and distributes an inhibiting potential over leads 67, 68 and 69 to gates 62 and 64. The effect of this inhibition on gates 62 and 64 is to prevent a binary "1" condition from passing into the second and fourth shift register stages. Consequently, the next succeeding state after 1111 is 0010, the original state existing in the shift register counter of Fig. 11, indicating a repetition of the cycle. A complete compilation of the states through which the shift register counter of Fig. 12 will pass is shown in Fig. 17.

Fig. 13 indicates that portion of the shift register stage which includes the transistor memory element or flip-flop and the delay elements. Fig. 14 illustrates a type of gate which may be advantageously employed as gates 62 and 64 of Fig. 12 to combine the usual input gate action of the shift register stages previously discussed with respect to Figs. 8 and 11, and in addition an inhibition control function. As shown by the dotted connection between similar terminals 70 of Fig. 13 and Fig. 14, the output of the gate of Fig. 14 connects to the base of the transistor memory element of Fig. 13. Terminal 85 of Fig. 13 is adapted to be connected to the input of the following shift register stage and terminal 71 of Fig. 14 is adapted to be connected to the output of the preceding stage. Terminal 72 of Fig. 14, the remaining input to the gate, is to be connected over lead 68 or 69 to the output lead 67 of the recognition gate 65 of Fig. 12.

It may be observed that the combination of Figs. 14 and 13 represents those shift register stages which include gates having an inhibition control function. As pointed out above, gates 62 and 64 are those that possess this inhibition control function. Thus, Figs. 14 and 13 in combination represent the detailed circuit components indicative of boxes 62 and SR2 of Fig. 12 or boxes 64 and SR4 of Fig. 12.

Fig. 15 illustrates the detailed circuit components of gate 63 of Fig. 12, the operation of which has been disclosed with respect to Fig. 11 (e.g. gate 17) and need not be repeated in detail here. It may be further observed that the combination of gate 63 and box SR3 of Fig. 12 is identical, insofar as the detailed circuit components are concerned, with the shift register stage SR2, for example, of Fig. 11. The remaining shift register stage SR1 of Fig. 12 is similar in its detailed circuit components to that of SR3 of Fig. 11 in that it has a memory element or transistor flip-flop and a delay element or resistance-capacitance combination.

Fig. 16 illustrates a type of recognition gate which may be employed as gate 65 of Fig. 12. The configuration and poling of the diodes in Fig. 16 is such that the output terminal 67 will adopt the lowest potential condition existing at the input terminals 75 through 78.

The detailed functioning of all of the circuit components disclosed in Figs. 13 to 16 have been elucidated fully in the descriptions of Figs. 8 and 11 with the exception of the inhibition control circuit of Fig. 14 and the recognition gate of Fig. 16.

The operation of the gate of Fig. 14 is as follows: when terminal 71 is at a positive potential or —1½ volts, indicating that the preceding stage is in a binary "1" condition, diode gate 73 is rendered conductive with respect to an incoming shift pulse. If, simultaneously, terminal 72 is at a negative potential or —14 volts indicating that the recognition gate is not activated, gate 74 is in the conductive condition. This follows since bias source 84 is adapted to be at a potential intermediate the potentials representing the positive and negative binary conditions, as was the case with bias source 59 of Figs. 8 and 11. Thus, a negative pulse from the shift pulse source will be transmitted through gate 73, condenser 86, gate 74, condenser 87 to terminal 70 at the memory element of the following shift register stage establishing a binary "1" condition therein.

Assuming terminal 71 is at a negative potential or —14 volts indicating a binary "0" in the previous shift register stage, shift pulse gate 73 will be in the nonconductive condition and no shift pulse can be transmitted through gate 73 to the associated memory element. This condition applies independently of the state of terminal 72 in the assumed circumstances.

In the event that terminal 71 is positive, evidencing a binary "1" condition in the previous shift register stage, gate 73 is rendered conductive as explained above. If, further, terminal 72 is also positive or —1½ volts, gate 74 will have a voltage on the anode side which may, for example, be —10½ volts and on the cathode side —1½ volts rendering said gate 74 non-conductive. Thus, the shift pulse may traverse gate 73 but will be impeded by gate 74. In summary then, it may be seen that a positive condition on terminal 72 indicating an energized recognition gate will block any shift pulses from passing through the gate to the associated memory element whenever the recognition gate is activated. This is the criterion which was recognized in the previous description of the operation of Fig. 12.

As indicated above the configuration and poling of the diodes of Fig. 16 will cause output terminal 67 to adopt the lowest potential condition existing at the input terminals 75 . . . 78.

Consequently, if any of the input leads to the gate in Fig. 16 are in the negative or binary "0" condition, the output lead 67 will be negative. However, if all the inputs to the gate are positive, the output terminal 79 will be in the positive condition, supplying an inhibiting potential over conductors 67, 68 and 69 (Fig. 12) to the terminals 72 of the inhibiting gates 62 and 64 of Fig. 12, thereby preventing the passage of a binary "1" condition into the associated shift register stages SR2 and SR4.

While I have illustrated my invention by particular embodiments thereof, said invention is not limited in its application to the specific apparatus and particular arrangements herein disclosed. Various applications, modifications and arrangements of the invention will readily occur to those skilled in the art, without departing from the scope of the invention.

What is claimed is:

1. A shift register counter comprising a plurality of shift register stages, each of said stages including bistable memory means and delay means adapted to momentarily retain the information stored in said memory means, all of said stages except one stage having input gating means, means for simultaneously transferring the state of some of said delay means to the next adjacent stage, gate translator means controlled by and responsive to the state of two of said shift register stages for controlling the succeeding state of a particular shift register stage, and means for connecting said shift register stages and said gating means serially in a closed reentrant path.

2. A counting device comprising a plurality of shift register stages for the cycling of a group of binary digits, each of said stages including bistable memory means and delay means associated with said memory means for temporary retention of the binary condition stored therein, resetting means for clearing said shift register memory means and for readying said memory means for reception of shifted data, input gating means associated with each one of said shift register stages except one stage, a gate translating device interposed between two of said stages for comparing the binary conditions stored therein and for controlling the succeeding state of another of said stages, shift pulse receiving means connected to said input gating means and to said gate translating device and adapted in cooperation with said gating means and said delay means to transfer the state of some of said stages to the next adjacent stage, and means connecting said gate translator device and said shift register stages serially in a reentrant manner.

3. A shift register counter comprising three shift register stages, each of said stages being in an electrical state denoting a binary digit, a gate translating device controlled by and responsive to the state of the second and third of said stages for controlling the succeeding state of said third stage, means for simultaneously transferring the state of said third stage directly to said first stage and the state of said first stage directly to said second stage, means connecting said stages and said gate translating device serially in a ring, thereby, in cooperation with said means for transferring the state of said stages, to generate a cyclical series of binary digits.

4. A transistor shift register counter comprising five shift register stages, each of said stages being in an electrical state denoting a binary digit, a gate translator device controlled by and responsive to the state of said third and fifth stages for controlling the succeeding state of said first shift register stage, means for simultaneously transferring the states of said first, second, third and fourth stages directly to said second, third, fourth and fifth stages, respectively, means connecting said shift register stages and said gate translating device serially in a ring, thereby, in cooperation with said means for transferring the states of said stages, to generate a cyclical series of binary conditions.

5. A shift register counter comprising a plurality of shift register stages, each of said stages including a transistor two-state memory means and delay means associated with said memory means adapted to momentarily retain the state stored in said memory means, some of said stages including input gating means, means for reading in a binary condition into said memory means, a gate translating device including a plurality of asymmetrically conducting devices for comparing the states of two of said stages to control the state of a particular one of said stages, means for resetting all of said stages to a given binary condition, shift pulse receiving means connected to said input gating means and said gate translating device and adapted to simultaneously transfer the state of some of said memory means to the next adjacent memory means, and means for sequentially energizing said shift pulse receiving means, thereby to generate a cyclical series of binary notations.

6. A transistor shift register counter comprising three shift register stages, each of said stages including a transistor bistable memory means and delay means associated with said memory means for temporary retention of a binary condition stored therein, asymmetrically conducting input gating means in some of said shift register stages, means for reading a binary condition into said memory means, a gate translator device connected to and responsive to the state of said second and third shift register stages for controlling the succeeding state of said third shift register stage, means for resetting said transistor bistable memory means to an original binary condition in readiness for reception of shifted data, shift pulse receiving means connected to said input gating means in said shift register stages and to said gate translator for simultaneously transferring the state of some of said memory means to the next adjacent stage and for transferring an electrical potential from said gate translator device to said third stage, and means connecting said transistor shift register stages and said gating device serially in a closed reentrant path.

7. A counting device comprising a plurality of shift register stages, each operable to store a binary condition therein, each of said stages including bistable memory means and delay means associated with said memory means for temporarily storing said binary condition, resetting means for clearing said shift register memory means and readying said memory means for reception of shifted data, input gating means in all of said shift register stages except one stage, shift pulse receiving means connected to said input gating means, a gate translating device interposed between two of said stages for comparing the binary conditions stored therein, said gate translating device comprising a plurality of asymmetrically conducting gates connected to said delay means associated with said stages between which said translating device is interposed and an asymmetrically conducting gating device connected to said shift pulse receiving means, means including said shift pulse receiving means adapted in cooperation with said gating means and said delay means to transfer the state of some of said stages to the next adjacent stage, means connecting said gate translator device and said shift register stages serially in a closed reentrant path, and recognition gating means connected to said delay means for detecting a given sequence of binary conditions.

8. A shift register counter comprising a plurality of shift register stages, each operable to store data therein, each of said stages including bistable memory means to register the data and delay means responsive to the operation of said bistable means to temporarily store said data, all of said stages except one stage having input gating means; means connected to said input gating means for simultaneously transferring the state of some of said memory means to the next adjacent stage; gate translator means controlled by and responsive to the state of two of said shift register stages for controlling the succeeding state of a particular shift register stage; said gate translator means including asymmetrically conducting gating devices connected to each of said stages controlling said gate translator, an asymmetrically conducting gating device connected to said means for simultaneously transferring the state of some of said memory means to the next adjacent stage, and an asymmetrically conducting gating device connected to said particular stage controlled by said gate translator; and means for connecting said shift register stages and said gating means serially in a closed reentrant path.

9. A counter comprising a plurality of transistor shift register stages, each operable to store data therein, each of said stages including bistable memory means to register the data, and delay means responsive to the operation of said bistable means to temporarily store said data; all of said stages except one stage having input gating means; means connected to said input gating means for simultaneously transferring the state of some of said memory means to the next adjacent stage; gate translator means controlled by and responsive to the state of two of said shift register stages for controlling the succeeding state of a particular shift register stage, said gate translator means including a first pair of diode gating means the cathodes of which are interconnected and the anodes of which are individually connected to said stages controlling said gate translator means, a second pair of diode gating means the anodes of which are interconnected, and the cathodes of which are individually connected to said stages controlling said gate translator means and to said anodes of said first pair of diode gating means, a first single diode gate connected to said means for simultaneously transferring the state of some of said memory means to the next adjacent stage, a second single diode gate having its cathode connected through impedance means to the anode of said first single gate, means connecting the anode of said second single diode gate through impedance means to a negative potential source, additional means connecting the anode of said second single diode gate through impedance means to the memory means of said particular shift register stage controlled by said gate translator, means connecting the cathodes of said first pair of diode gating means through impedance means to a negative potential source and through impedance means to ground, means connecting the anodes of said second pair of diode gating means through impedance means to a positive potential source and through impedance means to ground, means connecting the cathodes of said first pair of diode gating means through impedance means to the anode of said first single gate, and means connecting the anodes of said second pair of varistor gating means to the cathode of said second single gate.

10. A shift register counter comprising a plurality of shift register stages, each of said stages operable to a state indicative of a binary condition, a gating device controlled by and responsive to the state of two of said stages for controlling the succeeding state of a particular shift register stage, means connecting said shift register stages and said gating device serially in a closed reentrant path, recognition gating means connected to each of said shift register stages and adapted when energized in a predetermined manner to emit a potential indicating an energized condition, inhibiting means connected between certain of said shift register stages, and means for applying the potential from said recognition gating means to said inhibiting means, thereby to block the passage of certain binary conditions between adjacent shift register stages for producing a particular orbital count cycle.

11. A counter comprising a plurality of shift register stages each operable to store data therein, each of said stages including bistable memory means to register the data and delay means responsive to the operation of said memory means to temporarily store said data, resetting means for clearing said shift register memory means and readying said memory means for reception of shifted data, input gating means connected to certain of said shift register stages, a gate translating device interposed between two of said stages for comparing the binary conditions stored therein and for controlling the succeeding state of another of said stages, shift pulse receiving means connected to said input gating means and adapted in cooperation with said gating means and said delay means to transfer the state of some of said stages to the next adjacent stage, means connecting said gate translating device and said shift register stages serially in a reentrant manner, recognition gating means connected to all of said shift register stages and adapted when energized in a predetermined manner to produce an output potential, a plurality of inhibiting means connected between said shift register stages, and means for applying said output potential to said inhibiting means to block the passage of certain binary conditions between adjacent shift register stages, thereby to attain a desired orbital count cycle.

12. A counting device including a plurality of shift register stages, each operable to store data therein, each of said stages including bistable memory means to register the data, delay means responsive to the operation of said bistable means to temporarily store said data, resetting means for clearing said shift register memory means and preparing said memory means for reception of shifted data, input gating means in all of said shift register stages except one stage, shift pulse receiving means connected to said input gates, a gate translating device interposed between two of said stages for comparing the binary condition stored therein, means connecting said shift pulse receiving means to said gate translating device, means connecting said gate translating device and said shift register stages serially in a closed reentrant path, recognition gating means connected to said delay means for detecting a particular sequence of binary conditions, inhibiting control means between certain of said shift register stages, and means connecting said recognition gating means to said inhibiting control means for impeding the passage of certain binary conditions between adjacent shift register stages at the occurrence of a particular sequence of binary conditions, thereby to establish a given orbital series of binary digits.

13. A shift register counter comprising four shift register stages, each operable to store data therein, each of said stages including bistable memory means to register the data, delay means responsive to the operation of said bistable means to temporarily store said data, means for reading a binary condition into one of said memory means, a gate translator device interposed between two adjacent shift register stages, means connecting said gate translator device and said shift register stages serially in a closed reentrant path, inhibiting means interposed between the first and second of said shift register stages and between the third and fourth of said shift register stages, means for shifting the data in some of said stages to the next adjacent stage, recognition gating means adapted to produce a potential output at the occurrence of a particular binary sequence in said shift register stages, and means for applying said output potential to said inhibiting means for blocking the passage of certain binary digits, thereby to produce a particular sequential series of binary digits.

14. A transistor shift register counter comprising four shift register stages, each of said stages including a transistor two-state memory means and delay means associated with said memory means for temporary retention of the binary condition stored therein asymmetrically conducting input gating means between said second and third shift register stages, means for reading a binary condition into said memory means of said third shift register stage, gate translating means connected to and responsive to the state of said third and fourth shift register stages for controlling the succeeding state of said first shift register stage, means for resetting said transistor bistable memory means to an original binary condition in readiness for reception of shifted data, inhibiting control means connected between said first and second shift register stages and said third and fourth shift register stages, shift pulse receiving means connected to said gating means, to said inhibiting control means and to said gate translating means for simultaneously transferring the state of some of said memory means to the next adjacent stage, means connecting said transistor shift register stages and said gating device serially in a closed reentrant path, recognition gating means adapted to produce an output potential at the occurrence of a particular binary sequence in said shift register stages, means connecting said recognition gating means to said delay means, and means for applying said potential output to said inhiibting means to block the passage of certain binary digits between adjacent shift register stages thereby to establish a particular orbital sequence of binary digits.

15. A gating circuit including a signaling source, a load, coupling means for coupling a signal from said signaling source through said load, said coupling means including first and second diodes, a capacitor, means for connecting said signaling source, said first diode, said capacitor, said second diode and said load in series, and means for applying control voltages to said diodes to selectively enable said diodes whereby the simultaneous enabling of said diodes permits the passage of a signal from said signaling source through said load.

16. A transmission type gate including a source of input signals, a load, coupling means for coupling a signal from said source of input signals through said load, said coupling means including first and second diode gates, said diodes being poled in the same direction, a capacitor connected in series between said diodes, means connecting said source of input signals to said first diode gate, means connecting said load to said second diode gate, means for applying control voltages between said capacitor and said first diode to selectively bias said first diode to the low resistance state, and means for applying control voltages between said capacitor and said second diode to selectively bias said second diode to the low resistance state.

17. A gating device including a signaling source, a utilization circuit, coupling means for coupling a signal from said signaling source through said utilization circuit, said coupling means comprising first and second diodes, said diodes being poled in the same direction, a capacitor connected between said first and second diodes, means connecting said signaling source to said first diode, means connecting said utilization circuit to said second diode, and means for applying predetermined bias voltages between said capacitor and said first diode and between said capacitor and said second diode whereby said diodes are operative in response to the application of said predetermined voltages to permit the passage of a signal from said signaling source to said utilization circuit.

18. A gating circuit including a signaling source, a load, coupling means for coupling a signal from said signaling source through said load, said coupling means comprising first and second diodes, a capacitor, means for connecting said signaling source, said first diode, said capacitor, said second diode and said load in series, first and second potential control sources, a first pair of diodes individually connected to said first and second potential sources and jointly connected to said first diode, and a second pair of diodes individually connected to said first and second potential sources and jointly connected to said second diode, whereby the occurrence of dissimilar potentials at said first and second potential control sources enables the passage of a signal from said signaling source through said load.

19. A transmission type gate including a source of input signals, a load, means for coupling signals from said signal source through said load including first and second diode gates, said diodes being poled in the same direction, a capacitor connected in series between said diodes, means connecting said source of input signals to said first diode gate and means for applying control voltages to selectively enable said diodes including a first and second potential source, a first pair of diodes individually connected to said first and second potential sources and jointly connected to said first diode, a second pair of diodes individually connected to said first and second potential sources and jointly connected to said second diode, said first and second pairs of diodes being poled in opposing directions, whereby the occurrence of dissimilar potentials at said first and second potential sources enables the passage of a signal from said signal source through said load.

20. A gating device including a signaling source, a utilization circuit, means for coupling signals from said signaling source through said utilization circuit including first and second diodes, said diodes being poled in the same direction, a capacitor connected between said first and second diodes, means connecting said signaling source to said first diode, means connecting said utilization circuit to said second diode, and means for applying predetermined bias voltages between said capacitor and said first diode and between said capacitor and said second diode including first and second potential sources, a first pair of diodes individually connected to said first and second potential sources and jointly connected to said first diode, a second pair of diodes individually connected to said first and second potential sources and jointly connected to said second diode, said first and second pairs of diodes being poled in opposing directions, whereby the occurrence of dissimilar potentials at said first and second potential sources enables the passage of a signal from said signaling source through said utilization circuit.

References Cited in the file of this patent

UNITED STATES PATENTS

| | | |
|---|---|---|
| 2,539,623 | Heising | Jan. 30, 1951 |
| 2,636,133 | Hussey | Apr. 21, 1953 |
| 2,845,222 | Genna et al. | July 29, 1958 |
| 2,853,238 | Johnson | Sept. 23, 1958 |

OTHER REFERENCES

"The Transistor Regenerative Amplifier as a Computer Element," by Chaplin, from Proceedings of the Institution of Electrical Engineers (London), part III, vol. 101, 1954, pages 298–307 (pages 305–307 relied on).